Patented May 26, 1936

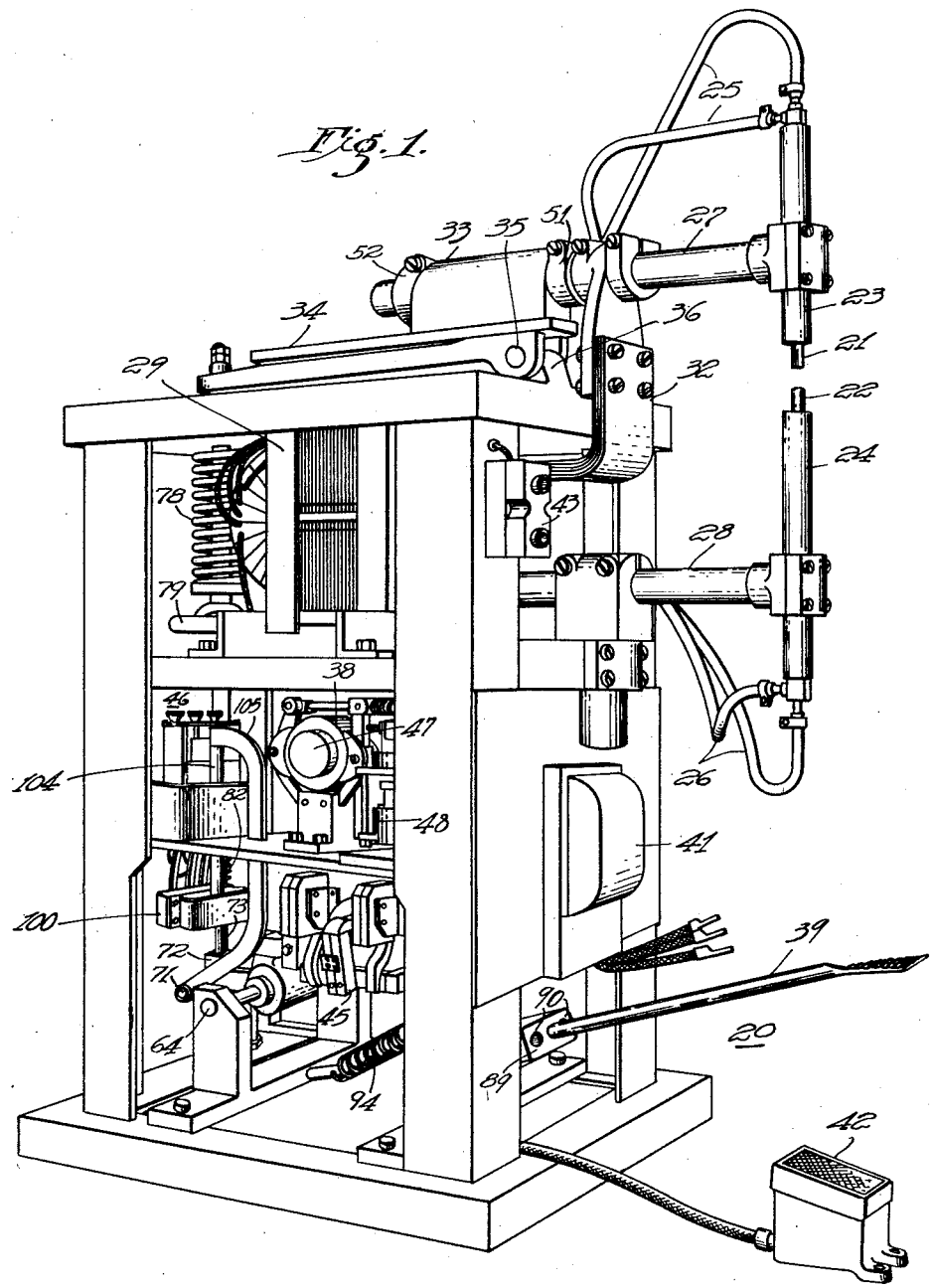

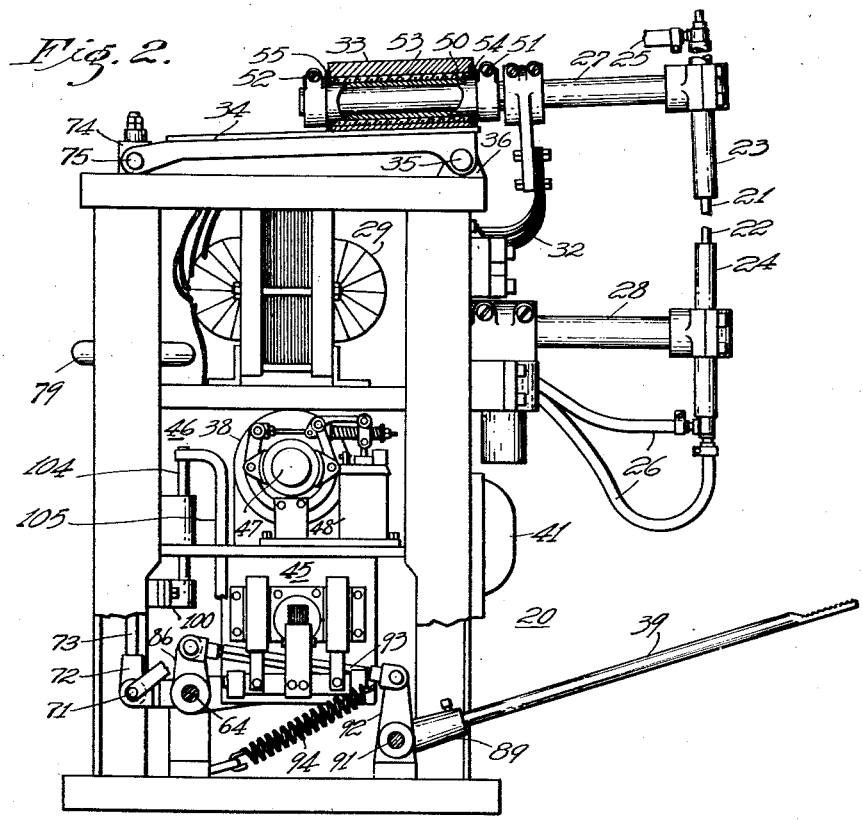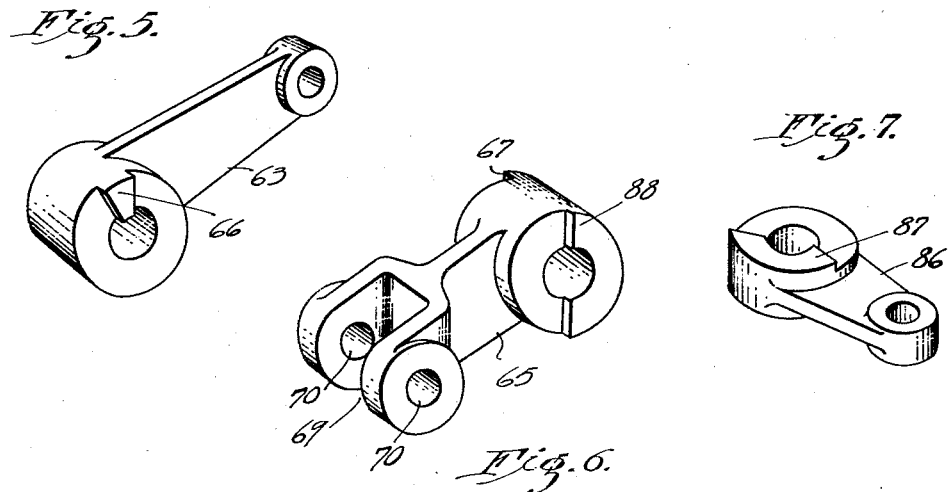

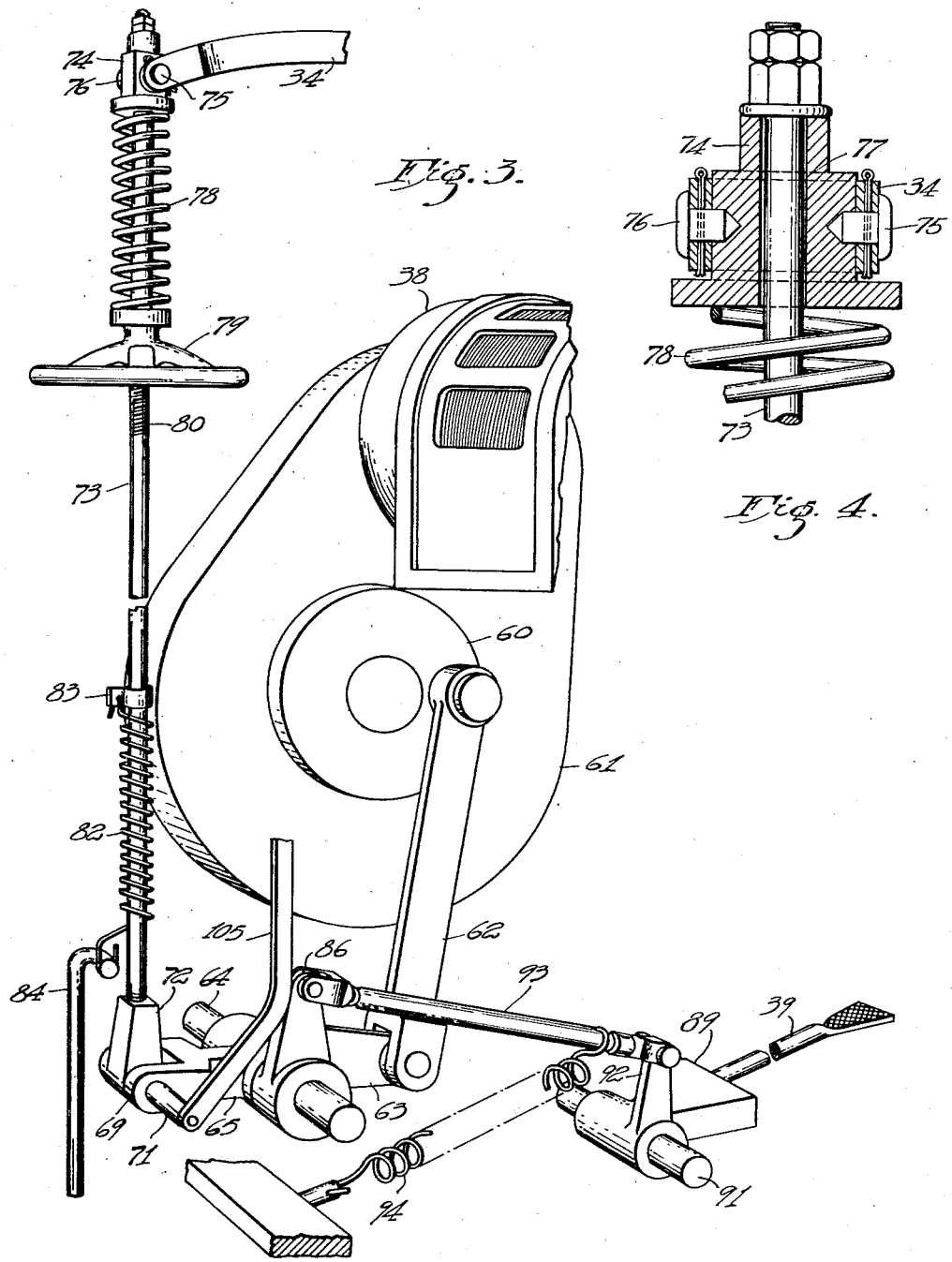

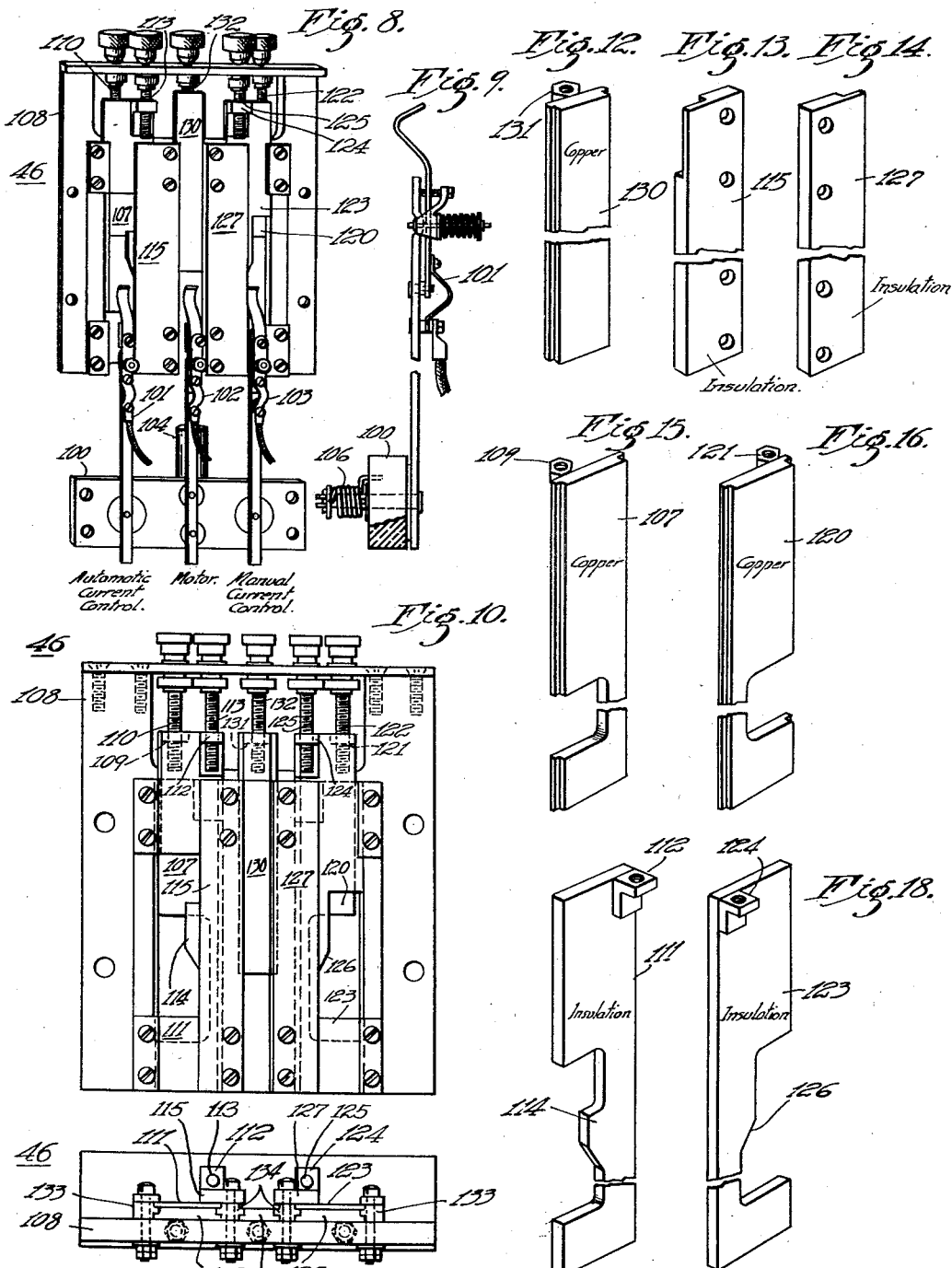

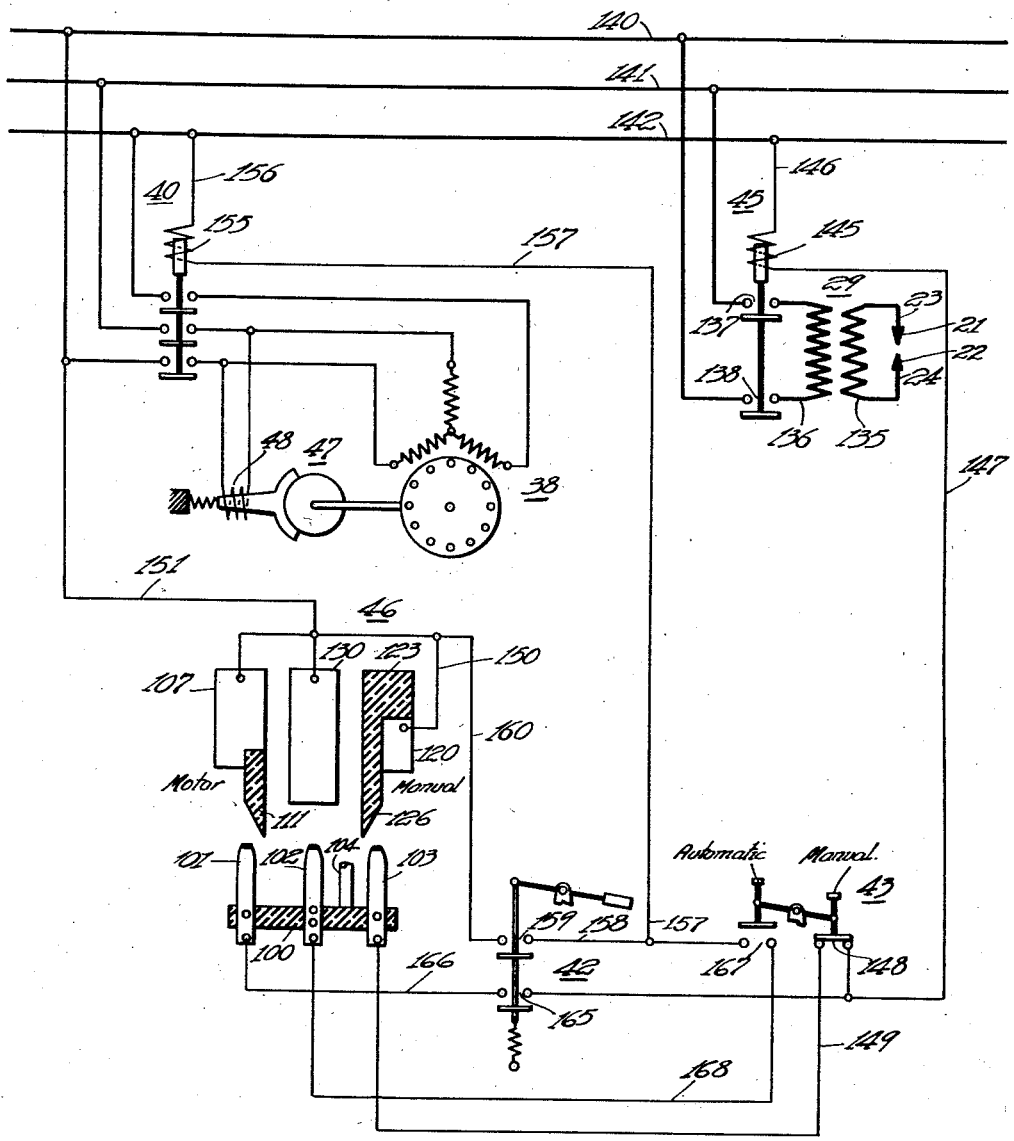

2,042,207

UNITED STATES PATENT OFFICE 2,042,207

SPOT WELDER

John L. Brown, Verona, and William R. Harding, Wilkinsburg, Pa., assignors to Westinghouse Electric & Manufacturing Company, East Pittsburgh, Pa., a corporation of Pennsylvania Application November 25, 1933, Serial No. 699,748

12 Claims. (Cl. 219—4)

Our invention relates, generally, to electric welding apparatus and it has particular relation to spot welding apparatus.

The object of our invention generally stated is to provide a spot welder which will be simple and efficient in operation and which may be readily and economically manufactured and installed.

One of the principal objects of our invention is to provide for directly connecting a motor to operate the movable electrode of a spot welder.

Another important object of our invention is to provide for supplying current for performing the spot welding operation while pressure is being applied to and removed from the work.

Another object of our invention is to provide for maintaining the motor in operation until a complete welding cycle has been performed.

A further object of our invention is to provide for manually controlling the spot welder in conjunction with the automatic control.

A still further object of our invention is to provide for applying welding current under manual control only when pressure is being applied to the work being welded.

Another object of our invention is to provide for applying the welding current during any desired portion of the time during which pressure is applied to the work.

Another object of our invention is to provide for effecting the foregoing control functions in accordance with the movement of the movable electrode.

Another object of our invention is to provide for insulating the movable electrode from the frame while still permitting the transmission of relatively large forces through the insulating medium.

Other objects of our invention will in part be obvious and in part appear hereinafter.

Our invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of our invention, reference may be had to the following detailed description taken in connection with the accompanying drawings, in which:

Figure 1 is a perspective view showing a spot welder embodying the principal features of our invention;

Fig. 2 is a view, in side elevation, of the spot welder shown in Fig. 1, certain parts being broken away to more clearly illustrate the invention;

Fig. 3 is an enlarged perspective view showing certain details of the operating mechanism;

Fig. 4 is a view, partly in side elevation and partly in section, illustrating how the push rod is connected to the operating arm of the upper electrode;

Figs. 5, 6 and 7 are enlarged perspective views of the crank arms illustrated in Fig. 3;

Fig. 8 is a perspective view of the control switch;

Fig. 9 is an enlarged view, in side elevation, of one of the fingers of the control switch illustrated in Fig. 8;

Fig. 10 is a view in front elevation of the control switch illustrated in Fig. 8, the contact fingers being omitted;

Fig. 11 is a view in bottom plan of the control switch illustrated in Fig. 10;

Figs. 12 through 18 are enlarged perspective views illustrating the details of the construction of the control switch shown in Figs. 8 and 10; and Fig. 19 illustrates diagrammatically the circuit connections which may be used in practicing our invention.

Referring now particularly to Fig. 1 of the drawings, the reference character 20 designates generally a frame which may be of welded construction and which is used for supporting the various cooperating instrumentalities forming the spot welder. The work to be welded may be positioned between tips 21 and 22 of the upper and lower electrodes 23 and 24, respectively. The electrodes 23 and 24 may be cooled by any suitable fluid, such as water, which may be supplied by means of rubber tubes 2⁵ and 26, as illustrated. Since the construction of the electrodes 23 and 24 and the water cooling means therefor are old and well known in the art, a further detailed description thereof will not be set forth in this specification.

The electrodes 23 and 24 are supported as illustrated by means of upper and lower electrode holders 27 and 28, respectively. The electrode holders 27 and 28 are connected to be energized from a suitable welding transformer 29 which is mounted within the main frame 20. The upper electrode holder 27 is connected to the transformer by means of a flexible connection 32, since it is arranged to be moved relative to the lower electrode holder 28 which may be directly connected to the transformer 29, in any well known manner.

The upper electrode holder 27 is mounted in a suitable support member 33 and insulated therefrom, the details of which will be set forth hereinafter, which, in turn, is mounted on an operating arm 34. As illustrated, the operating arm 34 is mounted for rotational movement relative to the main frame 20. A pin 35 is provided extending through suitable openings on the underside of the operating arm 34 and also through a suitable lug 36 carried by the main frame 20.

The operating arm 34 is adapted to be moved either by means of a motor 38, shown in Figs. 2, 3 and 19, or manually by means of a foot pedal 39. Both of these operating instrumentalities are directly connected to the operating arm 34 but are independently operable as will be apparent from the following description.

In order to control the operation of the motor 38, a motor line switch 40, Fig. 19, is provided in a suitable housing 41, mounted on the front of the main frame 20.

With a view to operating the spot welder automatically, a foot control switch 42 is provided and a transfer control switch 43 is provided for changing the electrical circuit connections for operation from manual to automatic or vice versa, as may be desired. The circuit connections for the control switches 42 and 43 are illustrated in Fig. 19 of the drawings.

The transformer 29 may be connected to a suitable current source by means of a transformer line switch 45 of the double pole contact type. The time during which this switch is energized may be controlled by means of a control switch, shown generally at 46, which is arranged to be operated in accordance with the movement of the movable electrode 23, as will be set forth hereinafter.

With a view to immediately stopping the motor 38 as soon as it is de-energized, a brake mechanism 47 is provided having an operating winding 48 for releasing the brake when the motor 38 is energized.

Referring now particularly to Fig. 2 of the drawings, it will be observed that the upper electrode holder 27 is mounted within a cylindrical metallic holder 50 and is secured thereto by means of clamps 51 and 52, clamp 51 being formed integrally with the holder 50. The cylindrical metallic holder 50 is encased in an insulating tube 53 which is mounted within the support member 33. Insulating washers 54 and 55 are provided at the ends of the insulating tube 53 in order to insulate the clamps 51 and 52 and the electrode holder 27 from the frame.

While the structure which has been described for insulating the upper electrode holder 27 provides the required degree of insulation, it will be also observed that the construction is such as to permit the transmission therethrough of the relatively high stresses which are necessary to apply the desired welding pressure to the work which is to be welded. A sufficiently large area is provided so that the unit stress applied to the insulating shell 53 will not be such as will crush it. It will also be observed that by loosening the clamps 51 and 52, it is possible to rotate the upper electrode holder 27 as may be desired, since it is slidably mounted within the cylindrical member 50. It is again pointed out that the clamp 51 is formed integrally with the cylindrical metallic holding member 50, so that the upper electrode holder 27 will be securely held in any desired position.

In order to more fully understand the details of the operating mechanism, reference may be had to Figs. 3 through 7 of the drawings in which the details of this mechanism are more clearly set forth. As illustrated, the motor 38 is arranged to drive a crank wheel 60 through a suitable reduction gearing system which may be enclosed within a gear housing 61. It is desirable to use a reduction gearing system between the motor 38 and the crank wheel 60 in order to provide for a wide range in the operating characteristics of the spot welder. That is, under certain conditions it may be desirable to weld a relatively small number of spots per minute while in another instance it may be desirable to weld a relatively large number of spots per minute. These different welding rates may be obtained by varying the gear combinations in the reduction gearing system. It will be understood that the work being welded will be moved as soon as a "welding cycle" has been completed so that another spot weld may be made at a different location.

The crank wheel 60, which is continually rotated in one direction when the motor 38 is energized is caused to transmit this rotary motion by means of a connecting rod 62 to a motor crank arm 63, Fig. 5, which is mounted to oscillate on a shaft 64. The oscillatory movement of the motor crank arm 63 is transmitted to a common crank arm 65, Fig. 6, which is also rotatable on the shaft 64. The motor crank arm 63 is provided with a projecting portion 66 which is arranged to engage a corresponding projection 67 on the common crank arm 65. The projection 66 forms only a portion of the total face of the motor crank arm 63 adjacent to the corresponding face of the common crank arm 65, in order to permit the latter to move independently relative to the former.

The common crank arm 65 is provided with a bifurcated arm 69 having suitable openings 70 through which a pin 71 may be positioned for engagement with a connection 72 into which the lower end of a push rod 73 may be secured. As illustrated, the push rod 73 extends upwardly and through a block 74 which is pivotally carried at the end of the operating arm 34 by means of pins 75 and 76 which extend into, but not through, the block 74. The upper end of the push rod 73 is reduced so that a sliding fit may be had with an opening 77 in the block 74 as illustrated. As is more clearly shown in Fig. 4 of the drawings, the upper end of the push rod 73 is slidably mounted within the block 74, so that it may move relative thereto. This relative movement is desirable in order to permit the push rod 73 to travel upwardly as far as it is urged in this direction without exerting more than a predetermined force on the work which is positioned between the tips 21 and 22 of the welding electrodes 23 and 24.

With a view to adjusting the pressure which may be applied to the work positioned as indicated, a pressure adjusting spring 78 is provided between the underside of the block 74 and an adjusting wheel 79 which is mounted on suitable threads 80 on the lower enlarged portion of the push rod 73. It will be understood that by rotating the adjusting wheel 79 to compress the adjusting spring 78, a greater welding pressure will be applied to the work than would be applied if the wheel 79 were rotated in the opposite direction to reduce the force tending to compress the spring. After the predetermined pressure has been applied to the work being welded, as controlled by the compression of the spring 78, a further application of pressure merely compresses the spring 78 further and the push rod 73 moves through the block 74 relative to the operating arm 34 without causing the application of any further welding pressure on the work being welded or movement of the operating arm 34.

A retrieving spring 82 is provided for returning the operating arm 34 and the various instrumentalities connected therewith to a position such that the electrode tips 21 and 22 will be operated to their wide open position. As illustrated, one end of the retrieving spring 82 is connected to a suitable clamp 83 secured to the push rod 73 while the other end is secured to a hook 84 that may be connected to the main frame 10.

In certain instances it may be desirable to operate the spot welder under manual control rather than under automatic control, as effected by the motor 38. With this type of operation in view, a foot crank arm 86, Fig. 7, is also mounted on the shaft 64 and is provided with a projection 87 for engaging a corresponding projection 88 on the common crank arm. It will be understood that the faces of the crank arms 65 and 86 provided with the projections 88 and 87, respectively, are mounted in such manner that the rotation of the foot crank arm 86 about the shaft 64 will cause the common crank arm 65 to be likewise rotated. However, these projections are also of such shape that the rotation of the common crank arm 65 on operation of the motor 38 does not cause any movement of the foot crank arm 86.

As shown, the foot pedal 39 is mounted in a socket 89 containing a plurality of openings 90, Fig. 1, so that the lever 39 may be inserted at different angles depending upon the nature of the work being welded. As shown in Figs. 2 and 3, the socket 89 is mounted for rotation about a shaft 91 and is provided with a crank arm 92 which is connected by means of a connecting rod 93 to the foot crank arm 86. A retrieving spring 94 is provided, as shown, for returning the foot pedal 39 and the cooperating instrumentalities connected therewith to the upper position as soon as the operator's foot is removed from the foot pedal 39.

It is desirable to control the application of welding current in accordance with the movement of the electrode 23 in order that it may be applied after the electrode tips 21 and 22 are in engagement with the work positioned therebetween, and may be cut off before these tips are separated from the work. This manner of operation is desirable in order to reduce the sparking at the tips 21 and 22 to a minimum.

In addition it is also desirable to maintain the motor 38 in operation, once a welding cycle is started, until the "welding cycle" is completed. By this use of the term "welding cycle" it is meant that the welding electrodes 23 and 24 are brought into engagement through the tips 21 and 22 with the work positioned therebetween, the proper pressure applied, welding current is supplied for the predetermined length of time and then cut off, and the pressure removed from the work. It is undesirable to stop the operation of the motor 38 while this cycle is being carried out, since it might result in a serious burning of the work and possible injury to the operator. It will be understood that it would be difficult for the operator to determine exactly when the "welding cycle" would be completed in view of the fact that it is often repeated at a relatively high rate, such as 90 welding operations per minute.

Since it is desirable to provide for applying the welding current during different periods of time depending upon whether the welder is operated automatically or manually, it is desirable to provide separate and distinct control apparatus for controlling such application of the welding current. As set forth hereinbefore, it is also desirable to maintain the motor 38 in operation until a welding cycle has been completed. All of these functions may be controlled by means of a single control switch which may be operated in accordance with the movement of the upper electrode 23 as reflected in the operating arm 34 and push rod 73.

The control switch 46 hereinbefore mentioned may be connected and arranged to perform all of the foregoing control functions. The mechanical details of the control switch will first be described and then its functioning in the control system will be set forth in detail.

Referring now in particular to Figs. 8 through 18 of the drawings, it will be observed that a common support member 100 of insulating material is provided on which three contact fingers 101, 102 and 103 may be mounted. The support member 100 has attached thereto a rod 104 which is connected by means of an arm 105 to the pin 71 located in the bifurcated arm 69 of the common crank arm 65. The movement of the push rod 73 and the corresponding movement of the upper electrode 23 will be translated to correspondingly move the support member 100 and, in turn, the contact fingers 101, 102 and 103, as will be readily understood.

It will be observed that the contact finger 102 is rigidly secured to the support member 100, so that it is not permitted to turn relative thereto. The other contact fingers 101 and 103, however, are mounted for rotation, respectively, in a clockwise and a counter clockwise direction under the influence of springs 106, only one of which is shown in Fig. 9. The springs 106 serve to bias the contact fingers 101 and 103 in the directions indicated. The purpose for this arrangement of the contact fingers 103 will appear hereinafter.

The contact finger 101 is arranged to engage a copper contact member 107, Fig. 15, in order to complete a circuit for controlling the time of application of welding current when the spot welder is operating under automatic control. The contact member 107 is slidably mounted in a suitable frame 108 and has secured thereto a nut 109 with which a screw 110 engages for adjustably positioning it as may be desired. An insulation strip 111, Fig. 17, is slidably positioned over the contact member 107 and is provided with a threaded lug 112 with which a screw 113 is adapted to engage for adjustably positioning the insulating piece 111, as may be desired.

It will be observed that the insulation piece 111 is provided with a cut away section and a projection 114 which is positioned in the line of travel of the upper end of the contact finger 101 as it is moved upwardly due to the shape of the projection 114 and the curved upper end of the contact finger 101. The latter, as it is moved upwardly, will be rotated slightly in a counterclockwise direction, until the straight longitudinal portion of the projection 114 is reached. With continued upward movement of the contact finger 101, the contact member 107 is engaged and, as the upward movement is continued past the upper end of the projection 114, the contact finger 101 will be rotated in a clockwise direction by means of the spring 106 until it engages the edge of an insulating clamp member 115, Fig. 13.

As soon as the upper end of the contact finger 101 engages the copper contact member 107, a circuit is completed, as will be hereinafter described, for effecting the application of welding current to perform the welding operation. The contact finger 101 will continue to move upwardly until the end of the stroke, at which time it will move downwardly. As soon as the upper end of the contact finger 101 engages the upper transverse edge of the projection 114, it will be disengaged from the copper contact member 107 and the welding current will be cut off from the work.

It will be observed from the foregoing description that welding current is applied at a predetermined time after pressure is applied to the work and that the welding current is continually applied until after the welding pressure has begun to be released from the work. For any given operation, therefore, it is possible to obtain the maximum time of application of welding current during a "welding cycle" with the result that a greater number of "welding cycles" per minute may be obtained than would otherwise be the case if the welding current were applied over a lesser portion of the welding cycle. It will also be apparent that the time of application of the welding current may be adjusted to occur during any desired portion of the time during which pressure is applied to the work by adjusting the relative positions of the contact member 107 and the insulating member 111.

When the welding operation is manually performed, it is desirable to apply the welding current only when the operator is depressing the foot pedal 39. It has been found that more satisfactory welds can be obtained when the current is controlled in this manner, since it is easier for the operator to judge the amount of time that the welding current is applied under this condition than would otherwise be the case. For this purpose, the contact finger 103 is provided which is arranged to engage a copper contact member 120, Fig. 16. The contact member 120 is arranged to be slidably mounted in the frame 108 and is provided with a nut 121 secured thereto with which a screw 122 engages to adjustably position the contact member 120 as may be desired.

With a view to permitting the contact finger 103 to engage the contact member 120 only during a portion of the down stroke of the foot lever 39, an insulation piece 123, Fig. 18, is provided which is slidably mounted in the frame 108. A threaded lug 124 is secured thereto and is arranged to be engaged by means of a screw 125, so that the insulating piece 123 may be adjusted as desired.

As illustrated, the insulation piece 133 is provided with a cut away portion having a projection 126. When the contact finger 103 is moved upwardly, the upper end thereof is caused to engage the lower end of the projection 126, so that the contact finger 103 is rotated in a clockwise direction, and continued upward movement causes it to engage the copper contact member 120. Continued upward movement causes the upper end of the contact finger to be removed from engagement with the contact member 120 because of engagement with the lower transverse edge of the overlapping portion of the insulating piece 123. The contact member 103 is then urged, by means of the spring 106, in a counter-clockwise direction until it is stopped by means of an insulating retaining member 127, Fig. 14. As soon as the contact finger 103 leaves the contact member 120, the welding current is cut off and, although further pressure may be applied, no more welding current is permitted to flow. It is then necessary to begin the "welding cycle" over again, returning the foot pedal to the upper position, before welding current can again be applied.

As set forth hereinbefore, it is desirable to maintain the motor 38 in operation in order to ensure that a welding cycle will be completed. This desired function is obtained through the use of the contact finger 102 which is arranged to engage a copper contact member 130, Fig. 12, slidably disposed in the frame 108 near the center thereof. The contact member 130 is provided with a nut 131 secured thereto which is arranged to be engaged by means of a screw 132 for adjusting the position of the contact member 130 as may be desired.

It will be observed that the contact finger 102 is arranged to engage the contact member 130, thereby completing a circuit, as will be hereinafter described to shunt the control for the motor 38, so that it will be maintained in operation until the end of a welding cycle.

Spacing strips 133 and 134, secured to the frame 108, are provided with suitable tongues to maintain the various parts of the control switch 46 in their proper operating relationship.

Referring now particularly to the diagram shown in Fig. 19 of the drawings, it will be observed that the transformer 29 is provided with a secondary winding 135 which is connected to the welding electrodes 23 and 24 and a primary winding 136 which is connected through contact members 137 and 138 of the line switch 45 to conductors 140 and 141 which may be connected to any suitable source of alternating current. In this instance, a three-phase source is indicated and an additional conductor 142 is provided for the third phase.

It will be observed that the motor 38 is of the polyphase squirrel-cage type but it will be readily understood that any other suitable type of motor may be used for operating the spot welder.

In operation, assuming that it is desired to operate the spot welder manually, the transfer control switch 43 will be operated to the "manual" position as indicated in Fig. 19. After the work has been positioned between the welding electrodes 23 and 24, the operator depresses the foot lever 39.

As a result of the downward movement of the foot lever 39, the operating force is transmitted through the mechanical linkage system described hereinbefore to the welding electrode 23, thereby causing it to move downwardly and to apply welding pressure to the work on which a welding operation is to be performed. At the same time that the electrode 23 is being moved downwardly, the movable fingers of the control switch 46 are being moved upwardly. Because of the fact that only a manual operation is being performed, it is necessary to consider only the functioning of the contact finger 103 in cooperation with the contact member 120.

The continued downward movement of the foot pedal 39 causes the contact finger 103 to engage the projection 126 of the insulating member 123, so that it is moved in a clockwise direction, until the outer edge of the projection is reached. Further upward movement finally causes the finger 103 to engage the contact member 120, at which time a circuit is completed for energizing the operating winding 145 of the line switch 45 to connect the primary winding 136 to the conductors 140 and 141. Welding current will then be caused to flow between the welding electrodes 23 and 24 and through the work positioned therebetween to perform the spot welding operation.

The circuit for energizing winding 145 may be traced from energized conductor 142 through conductor 146, winding 145, conductor 147, contact members 148 of the transfer control switch 43, now in the manual position, conductor 149, contact members 103 and 120 and conductors 150 and 151 to energized conductor 140.

As set forth hereinbefore, the continued upward movement of the contact finger 103 finally causes it to be removed from engagement with the contact member 120 on engagement with the insulation member 123. The circuit for energizing winding 145 of the line switch 45 is then opened, thereby permitting this switch to be operated to the open position and to cut off the welding current.

The foregoing cycle of operation may be repeated as desired.

It will be observed that the time during which the welding current is applied may be varied by adjusting the relative positions of the contact member 120 with respect to the insulation member 123. This adjustment may be obtained through the agency of the adjusting screws 122 and 125, respectively.

When it is desired to operate the spot welder automatically, the transfer control switch 43 may be operated to the automatic position. The work is then positioned between the welding electrodes 23 and 24 and the operator then may depress the foot control switch 42.

As soon as the foot control switch 42 is operated to the close position, a circuit is completed for energizing the motor 38 and releasing the brake 47. The motor 38 is energized through the operation of the motor line switch 40 on energization of the operating winding 155 thereof.

The circuit for energizing the winding 155 may be traced from the energized conductor 142, through conductor 156, winding 155, conductors 157 and 158, contact members 159 of the foot control switch 42 and conductors 160 and 151 to the energized conductor 140.

The energization of winding 155 causes the contact members of the line switch 40 to close, thereby connecting the windings of the motor 38 to the conductors 140, 141 and 142 over obvious circuits.

It will be observed that the application of energizing potential to the windings of the motor 38 also serves to energize the winding 48 of the brake 47, thereby releasing the brake at the time that the motor 38 is energized.

As soon as the motor 38 is energized, the crank wheel 60 is rotated to apply the desired welding pressure to the work being welded through the mechanical linkage that has been described hereinbefore. When a predetermined pressure has been applied to the work being welded, the welding current is applied thereto to perform the welding operation. This circuit is not completed until the contact finger 101 is caused to engage the contact member 107 of the control switch 46. As soon as this engagement takes place, the winding 145 of the transformer line switch 45 is energized, thereby causing the welding current to be applied to the work.

The circuit for energizing the winding 145 under automatic operating conditions may be traced from the energizing conductor 142 through conductor 146, winding 145, conductor 147, contact members 165 of the foot control switch 42 which are now closed, conductor 166, contact members 101 and 107 and conductor 151 to the energized conductor 140.

As has been set forth hereinbefore, it is desirable to maintain the motor 38 in operation until a complete "welding cycle" has been performed. Thus, if the operator releases the foot control switch 42 while the motor 38 is still operating, it is desirable to have it continue to operate until the welding electrodes 23 and 24 are separated. The contact finger 102 and the contact member 130 are provided for this purpose. It will be observed that they are connected in shunt circuit relation with the contact members 159 of the foot control switch 42, so that even though the contact members 159 are opened, the motor 38 will still continue to operate until the "welding cycle" has been completed. Due to the fact that the contact members 165 of the foot control switch 42 are opened as soon as this switch is released, the winding 145 of the line switch 45 is immediately de-energized and welding current ceases to flow.

The shunt circuit around the contact members 159 may be traced from contact members 159 through conductor 158, contact members 167 of the transfer control switch 43, conductor 168, contact members 102 and 130 and conductor 160 back to the contact members 159.

It will be observed that the time of application of welding current for automatic operation may be varied by adjusting the relative positions of the copper contact member 107 with respect to the insulation member 111 through the agency of the adjusting means provided therefor. Different times may be provided depending upon the nature and character of the work being welded.

It will also be observed that the time when the motor 38 will be automatically cut off due to the separation of the contact finger 102 from engagement with the contact member 130 may be varied by adjusting the position of the contact member 130 as may be desired.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. A spot welder comprising, in combination, a fixed electrode and a relatively movable electrode disposed for performing a welding operation on work positioned therebetween, circuit means for connecting said electrodes to a current source, manual and automatic operating means for moving said movable electrode relative to the other electrode to apply a predetermined welding pressure to said work, operating means directly connecting either said manual or automatic operating means to said movable electrode independently of said other operating means, and means for starting and stopping said automatic operating means to cause the welding pressure to be applied for performing a single spot welding operation.

2. A spot welder comprising, in combination a fixed electrode and a relatively movable electrode oppositely disposed for performing a welding operation on work positioned therebetween, circuit means for connecting said electrodes to a current source, manual and automatic operating means for moving said movable electrode relative to the other electrode to apply a predetermined welding pressure to said work, operating means directly connecting either said manual or automatic operating means to said movable electrode independently of said other operating means, means for starting and stopping said automatic operating means to cause the welding pressure to be applied for performing only a single spot welding operation, and welding current control means operable in accordance with the movement of said movable electrode operating means for effecting the application of welding current to the work during different cycles of operation depending on whether the welder is operated manually or automatically.

3. A spot welder comprising, in combination, a fixed electrode and a relatively movable electrode oppositely disposed for performing a welding operation on work positioned therebetween, circuit means for connecting said electrodes to a current source, motor means connected directly to the movable electrode for moving it toward the other electrode to apply a predetermined welding pressure to said work, and welding current control means movable continuously in accordance with the movement of said movable electrode operating means while pressure is being applied to said work for effecting the application of welding current continuously while pressure is being applied to and released from said operating means.

4. A spot welder comprising, in combination, a fixed electrode and a relatively movable electrode oppositely disposed for performing a welding operation on work positioned therebetween, circuit means for energizing said electrodes from a source of welding current, an electric motor directly connected to said movable electrode for moving it toward the other electrode to apply a predetermined welding pressure to said work, and control means connected to effect the energization of said motor for each spot welding operation.

5. A spot welder comprising, in combination, a fixed electrode and a relatively movable electrode oppositely disposed for performing a welding operation on work positioned therebetween, circuit means for energizing said electrodes from a source of welding current, an electric motor directly connected to said movable electrode for moving it toward the other electrode to apply a predetermined welding pressure to said work, control means connected to effect the energization of said motor for each spot welding operation, and welding current control means movable continuously in accordance with the movement of said movable electrode operating means while pressure is being applied to said work for effecting the application of welding current continuously while pressure is being applied to and released from said operating means.

6. A spot welder comprising, in combination, a fixed electrode and a relatively movable electrode oppositely disposed for performing a welding operation on work positioned therebetween, circuit means for energizing said electrodes from a source of welding current, an electric motor directly connected to said movable electrode for moving it toward the other electrode to apply a predetermined welding pressure to said work, manual control means connected to effect the energization of said motor for each spot welding operation, welding current control means operable in accordance with the movement of said movable electrode operating means for effecting the application of welding current to said electrodes, and additional control means operable in accordance with the movement of said movable electrode operating means and connected in shunt circuit relation with said manual control means for maintaining said motor energized until the completion of a cycle of the welding operation.

7. A spot welder comprising, in combination, a fixed electrode and a relatively movable electrode oppositely disposed for performing a welding operation on work positioned therebetween, circuit means for energizing said electrodes from a source of welding current an electric motor directly connected to said movable electrode for moving it toward the other electrode to apply a predetermined welding pressure to said work, manual control means connected to effect the energization of said motor for each spot welding operation, welding current control means movable continuously in accordance with the movement of said movable electrode operating means while pressure is being applied to said work for effecting the application of welding current continuously while pressure is being applied to and released from said work, and additional control means operable in accordance with the movement of said movable electrode operating means and connected in shunt circuit relation with said manual control means for maintaining said motor energized until the completion of a cycle of the welding operation.

8. A spot welder comprising, in combination, a fixed electrode and a relatively movable electrode oppositely disposed for performing a welding operation on work positioned therebetween, circuit means for energizing said electrodes from a source of welding current, an electric motor directly connected to said movable electrode for moving it toward the other electrode to apply a predetermined welding pressure to said work, control means connected to effect the energization of said motor for each spot welding operation, welding current control means operable in accordance with the movement of said movable electrode operating means for effecting the application of welding current continuously while pressure is being applied to and released from said operating means, and additional control means for positively maintaining said motor in operation until a cycle of the welding operation is completed.

9. A spot welder comprising, in combination, a fixed electrode and a relatively movable electrode oppositely disposed for performing a welding operation on work positioned therebetween, circuit means for energizing said electrodes from a source of welding current, an electric motor directly connected to said movable electrode for moving it toward the other electrode to apply a predetermined welding pressure to said work, control means connected to effect the energization of said motor for each spot welding operation, and brake means connected to be released when said motor is energized and to be applied when said motor is de-energized for stopping said motor when the movable electrode is in a predetermined position.

10. A spot welder comprising, in combination, a fixed electrode and a relatively movable electrode oppositely disposed for performing a welding operation on work positioned therebetween, a line switch having an operating winding for connecting said electrodes to a current source, a motor having direct driving connection with said movable electrode for operating it to apply a predetermined welding pressure to said work, and a control switch movable continuously in accordance with the movement of said movable electrode operating means while pressure is being applied to said work and electrically connected to the operating winding of said line switch for effecting the energization thereof to apply welding current during a predetermined portion of the welding cycle.

11. A spot welder comprising, in combination, a fixed electrode and a relatively movable electrode oppositely disposed for performing a welding operation on work positioned therebetween, a first line switch having an operating winding for connecting said electrodes to a current source, a motor having driving connection with said movable electrode for operating it to apply a predetermined welding pressure to said work, a second line switch having an operating winding for connecting said motor to a current source, a manually-operable control switch for effecting the energization of the operating winding of said second line switch for initiating the operation of said motor, and a control switch having a plurality of sets of contact members and operable in accordance with the movement of said movable electrode operating means, one of said sets of contact members being connected to effect the energization of the operating winding of said first line switch thereby causing welding current to flow during a predetermined portion of the welding cycle, and another of said sets of contact members being connected in shunt circuit relation with the contact members of said manually-operable control switch for maintaining the operating winding of said second line switch energized until a complete welding operation has been performed.

12. A spot welder comprising, in combination, a fixed electrode and a relatively movable electrode oppositely disposed for performing a welding operation on work positioned therebetween, a line switch having an operating winding for connecting said electrodes to a current source, manual and automatic operating means for moving said movable electrode relative to the other electrode to apply a predetermined welding pressure to said work, operating means directly connecting either said manual or automatic operating means to said movable electrode independently of said other operating means, and a control switch connected to more continuously in accordance with the movement of said movable electrode operating means while pressure is being applied to said work and electrically connected to the operating winding of said line switch for effecting the energization thereof to apply welding current during a predetermined portion of the welding cycle.

JOHN L. BROWN.
WILLIAM R. HARDING.